(12) United States Patent
Everly et al.

(10) Patent No.: US 11,340,121 B2
(45) Date of Patent: May 24, 2022

(54) HEATER ELEMENT HAVING TARGETED DECREASING TEMPERATURE RESISTANCE CHARACTERISTICS

(71) Applicant: WATLOW ELECTRIC MANUFACTURING COMPANY, St. Louis, MO (US)

(72) Inventors: Mark D. Everly, St. Charles, MO (US); Jeremy Ohse, St. Louis, MO (US); Patrick Margavio, Columbia, MO (US); Sanhong Zhang, Ballwin, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 58 days.

(21) Appl. No.: 16/884,853

(22) Filed: May 27, 2020

(65) Prior Publication Data

US 2020/0284180 A1 Sep. 10, 2020

Related U.S. Application Data

(62) Division of application No. 15/447,994, filed on Mar. 2, 2017, now Pat. No. 10,760,465.

(Continued)

(51) Int. Cl.
*H05B 3/18* (2006.01)
*H05B 3/00* (2006.01)
(Continued)

(52) U.S. Cl.
CPC .............. *G01K 7/16* (2013.01); *F01N 3/023* (2013.01); *F01N 3/027* (2013.01); *F01N 3/2006* (2013.01);
(Continued)

(58) Field of Classification Search
CPC ........ F01N 9/005; F01N 3/027; F01N 3/2013; F01N 11/005; F01N 11/002;
(Continued)

(56) References Cited

U.S. PATENT DOCUMENTS 4,808,009 A * 2/1989 Sittier .................... F25D 21/02
338/22 SD
4,960,551 A 10/1990 Eonomoto et al.
(Continued)

FOREIGN PATENT DOCUMENTS

CN 1160273 9/1997
CN 101589644 11/2009
(Continued)

OTHER PUBLICATIONS

Office Action issued in Japanese Application No. 2018545968, dated Oct. 5, 2021, with an English translation thereof, 11 pages.

*Primary Examiner* — John J Norton
(74) *Attorney, Agent, or Firm* — Burris Law, PLLC

(57) ABSTRACT

A method for operating a heater system including a resistive heating element having a material with a non-monotonic resistivity vs. temperature profile is provided. The method includes heating the resistive heating element to within a limited temperature range in which the resistive heating element exhibits a negative dR/dT characteristic, operating the resistive heating element within an operating temperature range that at least partially overlaps the limited temperature range, and determining a temperature of the resistive heating element such that the resistive heating element functions as both a heater and a temperature sensor. The resistive heating element can function as a temperature sensor in a temperature range between about 500° C. and about 800° C., and the non-monotonic resistivity vs. tem-
(Continued)

perature profile for the material of the resistive heating element can have a local maximum and a local minimum.

21 Claims, 6 Drawing Sheets

Related U.S. Application Data

(60) Provisional application No. 62/302,482, filed on Mar. 2, 2016.

(51) Int. Cl.

| | | |
|---|---|---|
| *F01N 3/023* | (2006.01) | |
| *G01K 7/16* | (2006.01) | |
| *F01N 11/00* | (2006.01) | |
| *F01N 3/027* | (2006.01) | |
| *G01F 1/68* | (2006.01) | |
| *H05B 1/02* | (2006.01) | |
| *F01N 13/00* | (2010.01) | |
| *F02D 41/02* | (2006.01) | |
| *F02D 41/14* | (2006.01) | |
| *F01N 9/00* | (2006.01) | |
| *G05D 23/185* | (2006.01) | |
| *F01N 3/20* | (2006.01) | |
| *F02D 41/22* | (2006.01) | |
| *G01M 15/05* | (2006.01) | |
| *G07C 5/08* | (2006.01) | |
| *H05B 3/20* | (2006.01) | |
| *H05B 3/40* | (2006.01) | |
| *G05D 23/24* | (2006.01) | |
| *G05D 23/30* | (2006.01) | |
| *H05B 3/14* | (2006.01) | |
| *G01F 1/86* | (2006.01) | |
| *F01N 3/10* | (2006.01) | |
| *F01N 3/021* | (2006.01) | |
| *F01N 3/08* | (2006.01) | |
| *H01C 7/02* | (2006.01) | |
| *H01C 7/04* | (2006.01) | |

(52) U.S. Cl.
CPC ............. *F01N 3/2013* (2013.01); *F01N 9/00* (2013.01); *F01N 9/002* (2013.01); *F01N 9/005* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/12* (2013.01); *Y02T 10/40* (2013.01)

(58) Field of Classification Search
CPC ..... F01N 2900/1602; F01N 2900/1404; F01N 2560/20; F01N 2240/16; H05B 2203/019; H05B 3/141; H05B 3/0042; F02D 41/1446; F02D 41/1447; G05D 23/185; G05D 23/2401; G05D 23/30; G05D 23/303; G01K 7/16; G01K 7/22–25; G01K 2205/04; H01C 7/04–049

See application file for complete search history.

(56) References Cited

U.S. PATENT DOCUMENTS

| | | | | |
|---|---|---|---|---|
| 6,588,268 | B1* | 7/2003 | Yamagishi | G01F 1/699 |
| | | | | 73/204.26 |
| 2003/0173072 | A1* | 9/2003 | Vinegar | B09C 1/02 |
| | | | | 166/66.5 |
| 2005/0109767 | A1* | 5/2005 | Fennewald | H05B 3/42 |
| | | | | 219/543 |
| 2011/0273263 | A1* | 11/2011 | Das | H01C 7/04 |
| | | | | 338/7 |
| 2014/0103298 | A1* | 4/2014 | Lee | G01K 7/22 |
| | | | | 257/29 |
| 2014/0217087 | A1* | 8/2014 | Biller | H05B 1/0227 |
| | | | | 219/494 |
| 2019/0204162 | A1* | 7/2019 | Ihle | B28B 11/243 |

FOREIGN PATENT DOCUMENTS

| | | |
|---|---|---|
| CN | 101962294 | 2/2011 |
| CN | 102047752 | 5/2011 |
| FR | 2851404 | 8/2004 |
| JP | S59192928 | 11/1984 |
| JP | H09180907 | 7/1997 |

* cited by examiner

HEATER ELEMENT HAVING TARGETED DECREASING TEMPERATURE RESISTANCE CHARACTERISTICS

CROSS-REFERENCE TO RELATED APPLICATIONS

This application is a divisional of U.S. patent application Ser. No. 15/447,994, filed on Mar. 2, 2017, which claims priority to and the benefit of U.S. provisional application Ser. No. 62/302,482, filed on Mar. 2, 2016, the contents of which are incorporated herein by reference in their entirety. This application is also related to the following applications: U.S. patent application Ser. No. 15/447,942, titled "Virtual Sensing System"; U.S. patent application Ser. No. 15/448,044, titled "System and Method for Axial Zoning of Heating Power"; U.S. patent application Ser. No. 15/447,964, titled "Heater Element As Sensor For Temperature Control In Transient Systems"; U.S. patent application Ser. No. 15/448,068, titled "Dual-Purpose Heater and Fluid Flow Measurement System"; U.S. patent application Ser. No. 15/448,162, titled "Heater-Actuated Flow Bypass"; U.S. patent application Ser. No. 15/448,108, titled "Susceptor for Use in a Fluid Flow System"; U.S. patent application Ser. No. 15/448,130, titled "Thermal Storage Device for Use in a Fluid Flow System"; and U.S. patent application Ser. No. 15/448,186, titled "Bare Heating Elements for Heating Fluid Flows," all filed Mar. 2, 2017, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of the any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various after-treatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements. For example, the downstream heating elements generally have a higher temperature than the upstream elements because the downstream heating elements are exposed to fluid having a higher temperature that has been heated by the upstream heating elements. Moreover, the middle heating elements receive more heat radiation from adjacent upstream and downstream heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to avoid failure of any of the heating elements. Therefore, the heating elements that are under the less harsh heating conditions are typically operated to generate a heat output that is much below their maximum available heat output.

SUMMARY

This section provides a general summary of the disclosure and is not a comprehensive disclosure of its full scope or all of its features.

In one form of the present disclosure, a method of operating a heater system including a resistive heating element having a material with a non-monotonic resistivity vs. temperature profile is provided. The method includes heating the resistive heating element to within a limited temperature range in which the resistive heating element exhibits a negative dR/dT characteristic, operating the resistive heating element within an operating temperature range that at least partially overlaps the limited temperature range, and determining a temperature of the resistive heating element such that the resistive heating element functions as both a heater and a temperature sensor. In some variations, the method includes heating a fluid flow passing through the heating system.

In at least one variation, the resistive heating element functions as a temperature sensor in a temperature range between about 500° C. and about 800° C. In some variations, the non-monotonic resistivity vs. temperature profile for the material of the resistive heating element has a local maximum and a local minimum. In such variations, the method can include correcting for resistance drift in the material of the resistive heating element based on at least one of the local maximum and the local minimum of the non-monotonic resistivity vs. temperature profile.

In some variations, the resistive heating element material comprises a composite ceramic and metal material having the negative dR/dT characteristic over the operating temperature range. In at least one variation the resistive heating element material includes an instantaneous negative thermal coefficient of resistance greater than −175 ppm/° C. over the limited temperature range. In some variations the resistive heating element functions as a temperature sensor at a temperature below 530° C. and/or the resistive heating element functions as a temperature sensor at a temperature above 850° C. In at least one variation, the method includes applying the material having the negative dR/dT characteristic (also referred to herein as by a "negative dR/dT material") with a layering process selected from the group consisting of thick film, thin film, plasma spraying and solgel.

In some variations, the resistive heating element is at least one resistive heating element arranged in a circuit. In such variations the circuit can define an expected temperature profile across the circuit during operation and the method can include positioning at least one resistive heating element at a location in the circuit where a higher temperature is predicted compared to the expected temperature profile. In at least one variation the circuit defines an expected temperature profile across the circuit during operation and the method includes positioning at least one resistive heating element at a location in the circuit where at least one of a higher temperature is predicted and a higher power density occurs compared to the expected temperature profile. In some variations the circuit includes at least one second resistive heating element comprising a material having a positive dR/dT characteristic. In such variations the method can include positioning the at least one second resistive heating element at a location in the circuit where at least one of a lower temperature and a lower power density occurs when compared to an average temperature profile. In still other variations, the circuit includes a plurality of resistive heating elements comprising a material having a negative dR/dT characteristic and a plurality of resistive heating elements comprising a material having a positive dR/dT characteristic. In such variations the method can include arranging the plurality of resistive heating elements comprising the material having the negative dR/dT characteristic and the plurality of resistive heating elements comprising the material having the positive dR/dT characteristic in the circuit according to predetermined positions corresponding to at least one of higher power density locations, lower power density locations, higher temperature locations, and lower temperature locations, respectively.

In at least one variation, the method includes positioning the plurality of resistive heating elements comprising the material having the negative dR/dT characteristic and the plurality of resistive heating elements comprising the material having the positive dR/dT characteristic in multiple layers relative to each other.

In some variations, the heater system includes a two-wire configuration for the resistive heating element and the method operates the resistive heating element as both a heater and a temperature sensor within the predetermined operating temperature range and operates the resistive heating element as a heater outside the operating temperature range.

In another form of the present disclosure, a method of operating a heater system is provided. The method includes operating a resistive heating element within a predetermined operating temperature range that at least partially overlaps a predefined limited temperature range, wherein a material of the resistive heating element has a non-monotonic resistivity vs. temperature profile and exhibits a negative dR/dT characteristic within the limited temperature range, and determining a temperature of the resistive heating element such that the resistive heating element functions as both a heater and a temperature sensor.

In some variations, the resistive heating element functions as a temperature sensor in a temperature range between about 500° C. and about 800° C. Also, in at least one variation the non-monotonic resistivity vs. temperature profile for the material of the resistive heating element has a local maximum and a local minimum. In such a variation, the method can include correcting for resistance drift in the material of the resistive heating element based on at least one of the local maximum and the local minimum of the non-monotonic resistivity vs. temperature profile.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
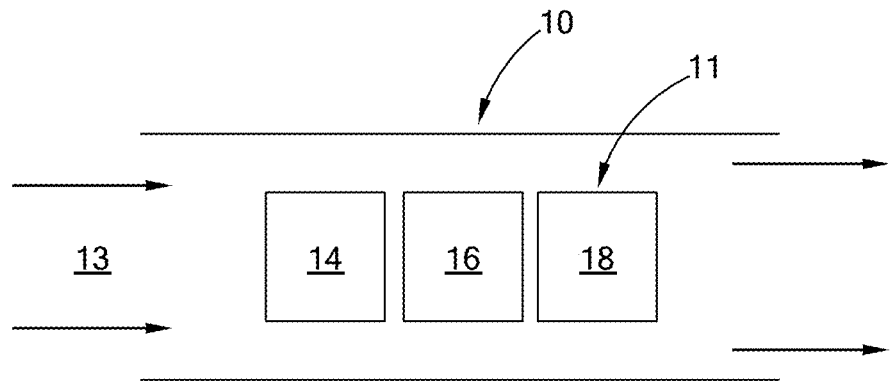
FIG. 1 is a schematic diagram of a conduit having a plurality of heating circuits disposed therein in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides one or more electric heater circuits with a decreasing resistance versus temperature characteristic. As a result, the power distribution over a surface of the heating circuit adjusts to environmental or physical perturbations such that deviations from a target temperature profile are reduced. Additionally, the intensity of "hot spots" is reduced, thereby improving heater life/reliability.

Referring to FIG. 1, in one form of the present disclosure, a schematic fluid flow system 10 is shown. Fluid flow system 10 includes a heater 11 having at least one resistive heating element 14. Heater 11 is provided within a fluid flow pathway 13 and adapted to heat the fluid flow. In this example, the heater 11 includes a plurality of resistive heating elements 14, 16, and 18. At least one resistive heating element 14 includes a material having a non-monotonic resistivity vs. temperature profile and exhibits a negative dR/dT characteristic over a predetermined operating temperature range. As used herein, the term "non-monotonic" is intended to reflect the behavior of the resistivity of a material over a time period that both increases and decreases on different intervals, as shown by the various graphs herein.

In one form, the negative dR/dT characteristic may be used at temperatures below 530° C. or above 850° C., and the negative dR/dT characteristic may occur at predetermined operational conditions where a local maximum change of resistivity relative to temperature is at least 2.3% higher than a local minimum change of resistivity. In another form, the material includes a composite ceramic and metal material having a negative dR/dT characteristic over a predetermined operating temperature range. The at least one resistive heating element can further include at least one of a ductile wire, foil, strip, and combinations thereof, and wherein the material includes an instantaneous negative thermal coefficient of resistance greater than −175 ppm/° C. over a predefined range.

In another form, the resistive heating element 14 of the heater 11, may be arranged in a circuit as shown in FIG. 1. The circuit may define an expected temperature profile across the circuit during operation and at least one negative dR/dT characteristic resistive heating element is positioned at a location in the circuit where a higher temperature is predicted compared to the expected temperature profile. The circuit may contain a positive dR/dT characteristic resistive heating element (e.g., either resistive heating element 16 and/or 18) positioned at a location where a lower temperature is compared to the average temperature profile. Further, the circuit may include a plurality of resistive heating elements comprising a material having a negative dR/dT characteristic or a positive dR/dT characteristic, wherein the negative dR/dT resistive heating elements and the positive dR/dT resistive heating elements are arranged in the circuit according to predetermined positions corresponding to predicted higher temperature locations and lower temperature locations, respectively.

In yet another form, the at least one resistive heating element including the material having the negative dR/dT characteristic is positioned at a location in the circuit with a higher power density compared to an average of the temperature profile. In even yet another form, the negative dT/dT material is applied by a layering process such as, by way of example, thin film, thick film, plasma spraying and solgel. The negative dR/dT resistive heating elements and the positive dR/dT resistive heating elements of the heater may be positioned in multiple layers relative to each other. The positive dR/dT characteristic resistive heating element can be positioned at a location in the circuit where at least one of a lower temperature and a lower power density occurs when compared to an average temperature profile.

Figure 9:
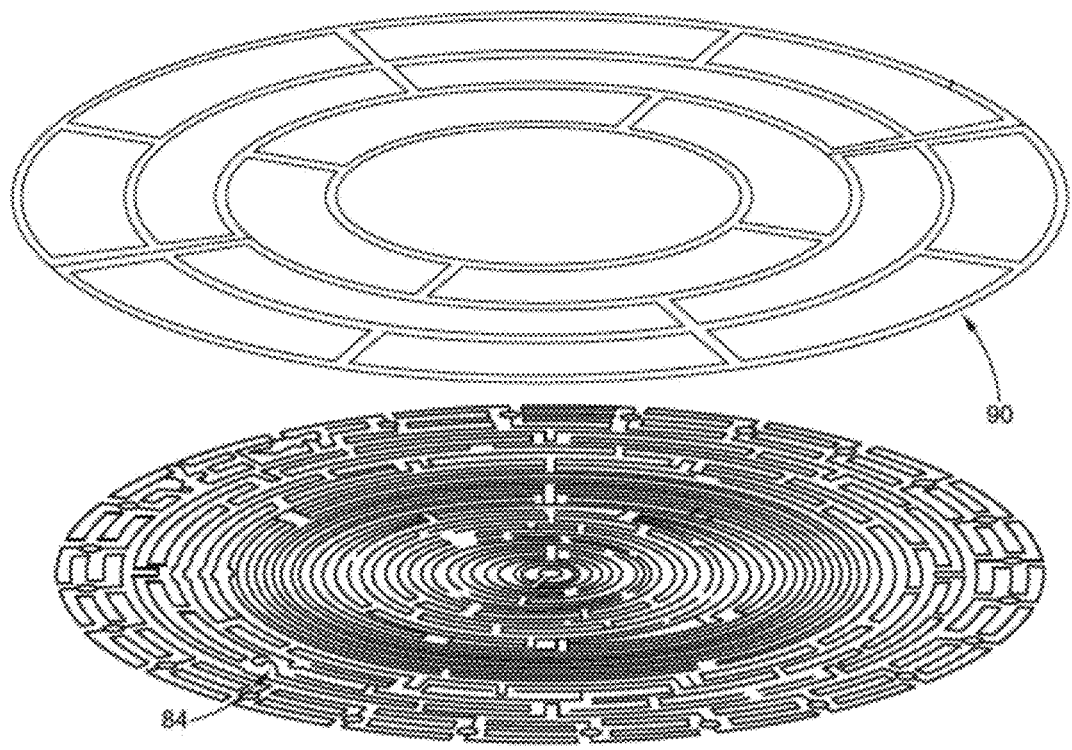
FIG. 9 is a perspective exploded view of a heater illustrating a first layer and a second layer in accordance with the principles of the present disclosure.

In another form, the multiple heater layers have a first layer 84 and a second layer 90 as shown in FIG. 9. The first layer 84 defines a plurality of zones of temperature control and the second layer 90 defines fewer zones of temperature control with respect to the first layer 84, and the second layer 90 includes at least one negative dR/dT resistive heating element. Moreover, the first layer 84 of the heater may include at least one positive dR/dT resistive heating element. Furthermore, any layer of the heater may be pixelated P. Such a pixelated structure is disclosed in U.S. Pat. No. 9,263,305, which is commonly assigned with the present application and the contents of which are incorporated herein by reference in their entirety.

In one form, the resistive heating element material having the negative dR/dT characteristic includes Nichrome. The Nichrome can be any combination of Nickel and Chromium. In another form, the Nichrome includes Nickel at a weight percentage of about 80% and Chromium at a weight percentage of about 20%.

In yet another form, a heater system for heating a fluid is provided. The heater system includes a plurality of circuits arranged in a series provided within a flow path of the fluid. At least one circuit of plurality of circuits includes a resistive heating element including a material having a negative dR/dT characteristic over a predetermined operational temperature range.

In still yet another form of the present disclosure, the heater system may include a second set of a plurality of circuits having a resistive heating element including a material having a positive dR/dT characteristic. The second circuit is adaptable to allow for measurement of temperature across the circuit. Furthermore, the first circuit and the second circuit of the heater system are positioned relative to each other in the series and are adapted to reduce formation of hot spots as compared to a series of circuits without a circuit having a negative dR/dT resistive heating element.

Figure 2:
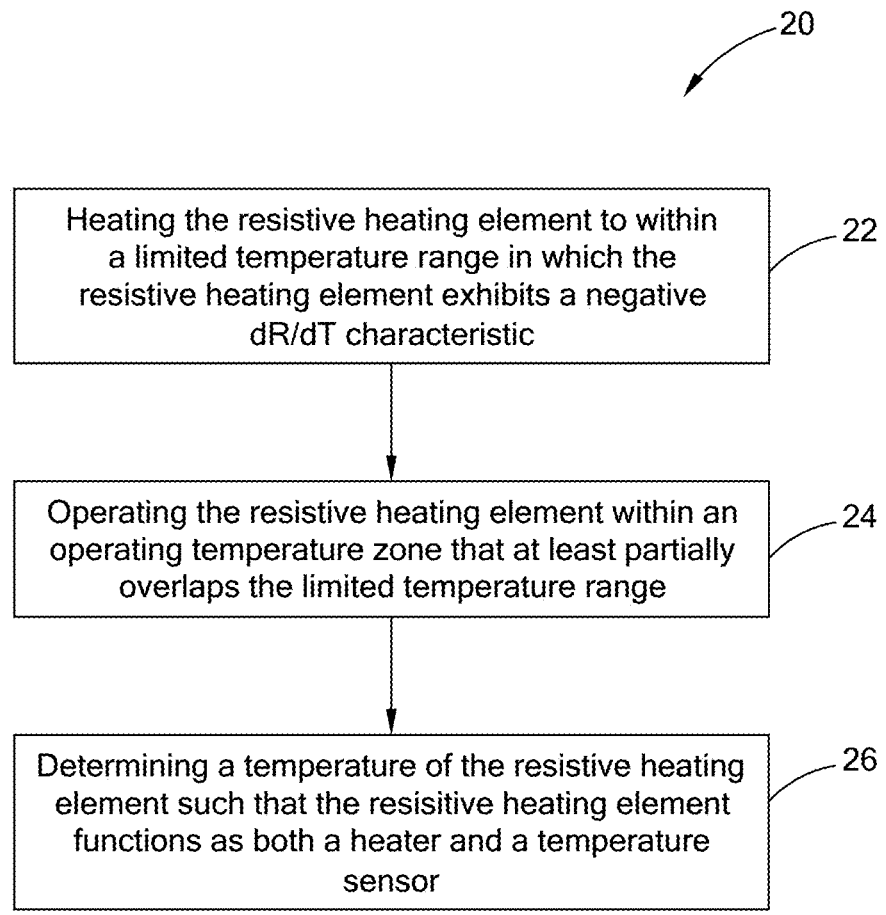
FIG. 2 is a schematic flow chart of a method of a heating a fluid flow in accordance with the present disclosure.

Referring to FIG. 2, in yet another form of the present disclosure, a method 20 of operating a heater system for heating fluid flow is disclosed where the heater system includes a resistive heating element. The method includes: heating the resistive heating element to within a temperature range where the resistive heating element exhibits a negative dR/dT characteristic as shown in block 22; operating the resistive heating element within an operating temperature zone that at least partially overlaps the limited temperature range as shown in block 24; and determining a temperature of the resistive heating element such that the resistive heating element functions as both a heater and a temperature sensor as shown in block 26. The resistive heating element can further be operable as a temperature sensor in a temperature range between about 500° C. and about 800° C.

Historically, when the character of changes in resistivity with temperature have been considered, materials used for resistive heating circuits have been selected for a minimum dR/dT (to minimize inrush currents or to minimize changes in current for uniform power over the operating temperature range) or, in some cases a positive dR/dT (to enable determination of circuit temperature through changes in circuit resistance, or electrical current and applied voltage). Some such metal materials are mildly positive dR/dT (change in resistance over temperature), and others are strongly positive dR/dT. Circuits created with such metal materials tend to react to perturbations in thermal loading by making hot spots hotter. For example, if a circuit arranged over a surface encounters a condition where one section is subjected to relatively less thermal load than the design condition, that decrease in thermal load will tend to increase the temperature of that section of the circuit. The positive dR/dT material will show an increased resistance in the zone of increased temperature and will therefore produce proportionately more heat than other sections of the circuit. This tendency to produce more heat in relatively hotter sections of the circuit causes the temperature to increase further in that section (i.e. "hot spots") and to cause the deviation from the desired temperature distribution to be greater than if the resistance of that section of the circuit had not increased. This same characteristic causes a cold spot caused by an increase in thermal load to get colder due to a decrease in the local heat generation.

Advantageously, application of materials having a negative dR/dT, which have never before been used in heater applications due to their perceived inability to provide requisite wattage distributions, are employed by the teachings of the present disclosure. Heating circuits made of materials having a negative dR/dT characteristic will tend to counteract the deleterious effects of a perturbation in thermal load. For example, if a circuit arranged over a surface encounters a condition where one section is subjected to relatively lower thermal load than the design condition, that decrease in thermal load will tend to increase the temperature of that section of the circuit. The negative dR/dT material will show a decreased resistance in the zone of increased temperature and will therefore produce proportionately less heat than other sections of the circuit. This tendency to produce less heat causes the temperature to increase less and causes the deviation from the desired temperature distribution to be less than if the resistance (and resistivity) of that section of the circuit had not decreased. This same characteristic will cause a cold spot to be not as cold as for a circuit with constant resistivity and resistance. Selection of heating circuit materials with improved negative dR/dT characteristics over selected operating temperature ranges has not previously been attempted.

Further, a perturbation in local temperature can be caused by a change in the physical characteristics of the circuit (e.g. dimensions, oxidation, etc.). The negative dR/dT material will tend to reduce the corresponding local temperature increase (or decrease) caused by these physical changes. Since local damage, fatigue cracking or oxidation of heating elements and the associated local temperature increases are a source of accelerated failure of heating circuits, the negative dR/dT materials will tend to offer improved reliability and heat generation capacity than positive dR/dT materials, given the same set of operational conditions.

A variety of applications for such negative dR/dT materials include, by way of example:

1. In certain cases where a high-definition or pixelated heater is used to enhance the control over temperature distribution, multiple heater layers are used, with at least one layer arranged to have many zones of temperature control and with at least one layer having fewer zones and much higher heat generation per unit of surface area. In this case, it would be desirable to use a material with a negative dR/dT in the operating temperature range for the layer with higher heat generation and to use a material with positive dR/dT (or multiple such materials) for the pixelated layer (to enable two-wire control/temperature control using heater resistance as a temperature feedback signal). In this arrangement, the benefit of the negative dR/dT material would reduce the non-uniformity that would need to be overcome by the pixelated layer thereby enabling more of the capacity to use controlled, non-uniform power generation to overcome the perturbations in thermal load due to the application environment of the heater (and causing less power to be needed to overcome the characteristic of the heater). Negative dR/dT materials may also be used for the pixelated layer and to gain the benefit of improved uniformity and reliability within the pixels if an algorithm for overcoming the ambiguity in temperature associated with a given resistance can be created;

2. In cases where a flow of fluid is to be heated, a series of circuits can be used by placing them within the flow and arranging them so that the flow passes over the circuits in series. In such cases, it is also useful to have a material with a strongly positive dR/dT for the heating circuit so that a measurement of temperature can be inferred from a measurement of the resistance changes of the circuit. However, circuits with this strongly positive dR/dT characteristic will tend to make hot spots along the length of the heater circuit even hotter and thus the life of a given circuit will be adversely affected (or the maximum design heat flux would need to be reduced in order to preserve an acceptable reliability, resulting in a larger and more costly heater). Therefore, for systems with multiple heating circuits placed across the flow, it will be advantageous to make some circuits from a material with a negative dR/dT in the operating temperature range and others with a positive dR/dT to allow for measurement of temperature. Positioning the circuits constructed of the negative dR/dT material at the locations where the highest temperature would be encountered and placing the circuits with the positive dR/dT material in locations that are designed to operate a lower temperature (either by virtue of their position up-stream in the flow or by virtue of being designed to produce lower heat flux) would offer advantages of both materials for a system using multiple resistive heating elements;

3. In an application of a lithography tool, one objective is to compensate for thermal load with high accuracy and rapid response time at room temperature. This technique may be applied to a uniform thermal profile generated with a negative dR/dT material used as a resistive heating element and being continuously cooled (to hold plate at, or near, room temperature). Therefore, the negative dR/dT characteristic of a material would help to automatically and rapidly compensate for these fluctuations. Any candidate negative dR/dT material would have an extreme negative dR/dT characteristic in this range so that the necessary stability could be maintained at 22C+/− at most 0.00001C. One such material may be graphene oxide, which can have a negative resistance characteristic from 10° C. to 150° C.

Additional exemplary materials that exhibit a negative dR/dT characteristic in a useful heating range which may be employed according to the teachings of the present disclosure include, by way of example:

HAYNES® 214 (UNS N07214)
HAYNES® 230 (UNS N06230)
HAYNES® 25 (UNS R30605)
HAYNES® B-3 (UNS N10675)
Reduced Graphene Oxide (RGO)
Vanadium Oxide
CERMET® materials (e.g. Cr/Si, TaN(Cu), TaN(Ag), etc.) (change to negative dR/dT characteristic at some concentration of ceramic (a few percent for Cr/SiO, 50% $SiO_2$ in $Cr/SiO_2$, <30% Ag, <40% Cu) and the magnitude of the negative dR/dT characteristic can be controlled by the ceramic composition). These materials generally have a high resistance, and therefore, one useful form would be a thin film. CERMET® thin films may thus enable a higher level of two-wire controllability in high-definition/pixelated heater applications.

Nichrome alloys: these materials have been discovered to have a mild negative dR/dT characteristic and thus can be used as a material to support two-wire sensing and control of an electric heater over a "useful" temperature range. This useful range is between about 550° C. and about 800° C. Although used for a resistive heating element material, the mild negative dR/dT characteristic has not been used for two-wire control. Additionally, this material may further be used for in-situ re-calibration with its mild negative dR/dT characteristic.

Figure 3:
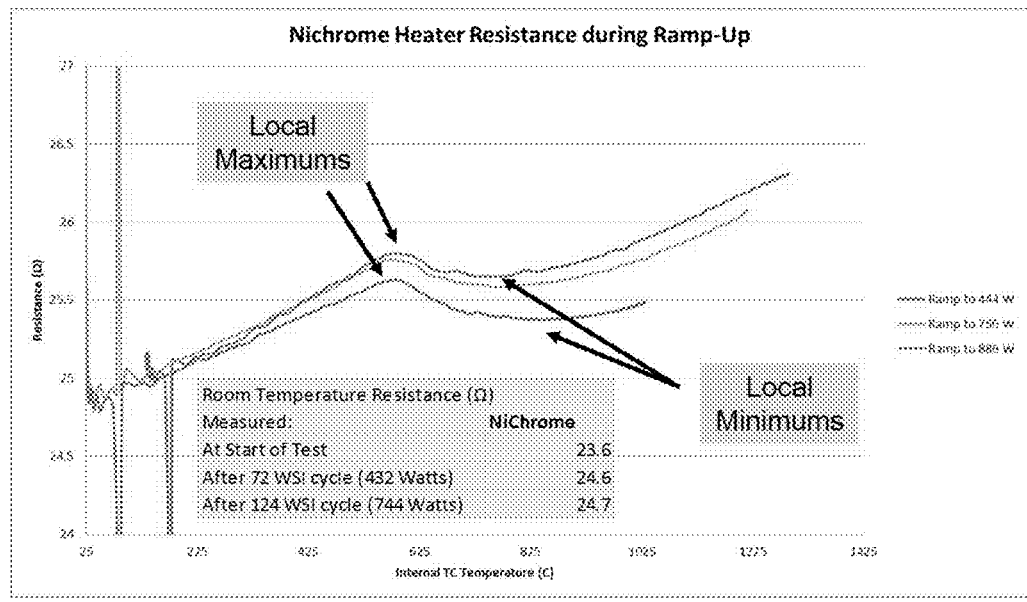
FIG. 3 is a graph of local dR/dT maximums and local dR/dT minimums and resistance-to-temperature (R-T) characteristics according to experimental data derived within the development the present disclosure.
Figure 4:
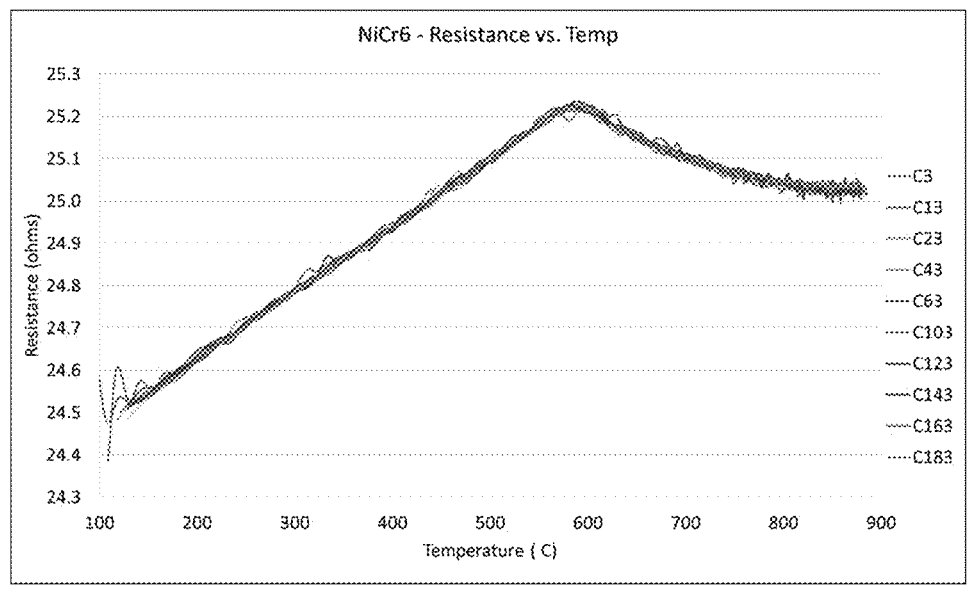
FIG. 4 is another graph illustrating local maximums and R-T characteristics according to experimental data derived within the development the present disclosure.

FIG. 3 shows non-monotonic behavior in which the same resistance is achieved at three different temperatures and also shows a resistance to temperature relationship that has shifted after use at high temperatures. According to FIG. 3, the temperatures at the local dR/dT maximums have been shown in testing to be stable during rapid heating events. FIG. 4 shows the results of over 180 cycles to a temperature of about 900° C. (Temperature was measured by an internal thermocouple in a cartridge type heater in this experiment). Additional testing has shown that after a short burn-in, with rapid heating, the local dR/dT maximum typically remains within a range of 15° C. even when exposed to higher temperatures that may damage the heater. FIG. 3 illustrates one example of this behavior, although the resistance value goes up after exposure to high temperatures, the temperature at the local dR/dT maximum does not vary significantly. Although the local dR/dT minimum appears to vary more than the local dR/dT maximum, the apparent change may be due to the overall change in slope of the curve. The portion of the curve surrounding the local dR/dT minimum may also be of use to improve resistance to temperature (R-T) interpretation and calibration.

FIG. 3 shows three (3) resistance vs temperature curves for an 80 Nickel, 20 Chromium resistance heating element within a cartridge heater. Due to exposure to high temperatures as high as 1200° C. and higher, the resistance curve has shifted. The table on the chart also shows that room temperature resistance has shifted from an initial value prior to exposure to temperature. If more accurate resistance measurements are possible, then a combination of the shift at the local maximum and the shift at another temperature could be used as a two-point in situ calibration.

Figure 5:
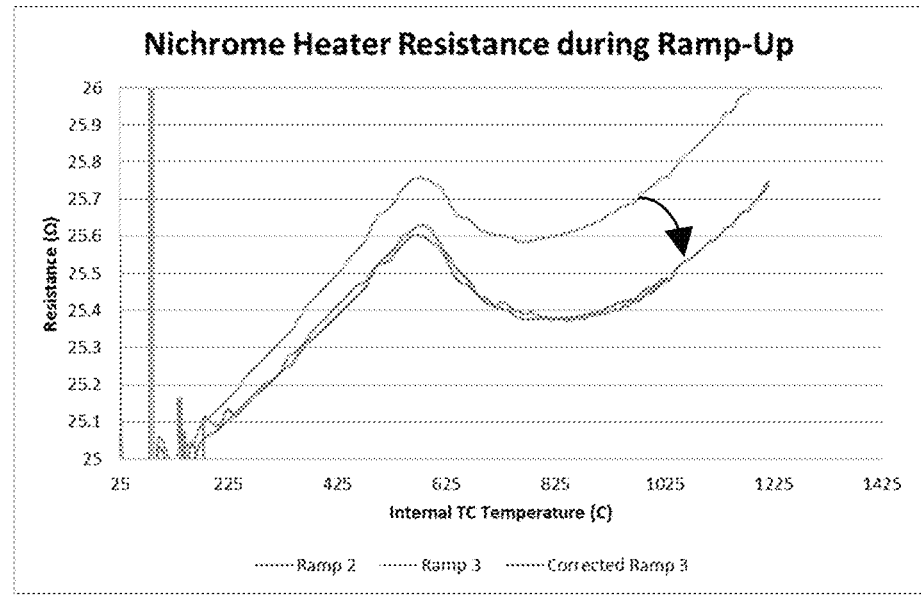
FIG. 5 is yet another graph illustrating local dR/dT maximums and local dR/dT minimums and R-T characteristics according to experimental data derived within the development the present disclosure.
Figure 6:
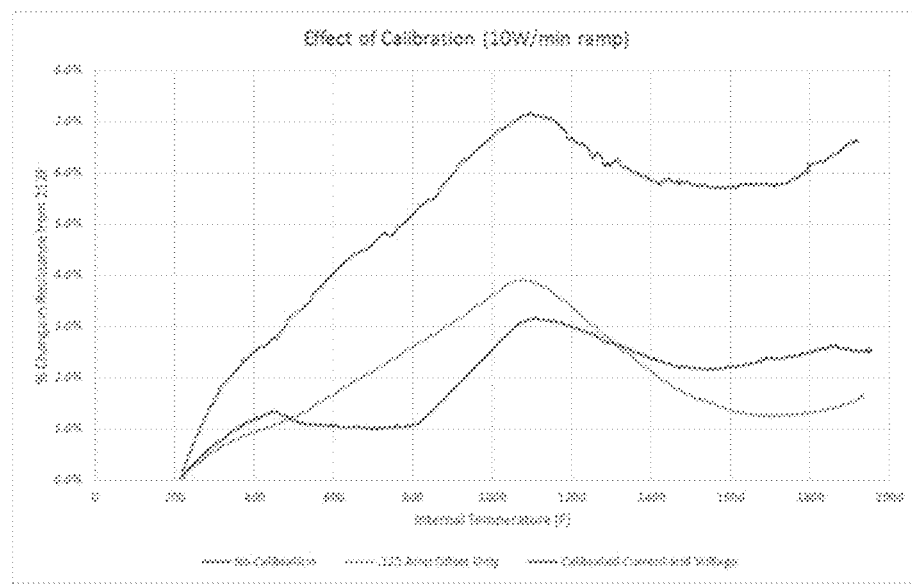
FIG. 6 is a graph illustrating the effect of calibration on the R-T characteristics of a heater according to the present disclosure.

FIG. 5 shows an example of how the shifted curve can be corrected by using resistance values at 200° C. and the local maximum. A two-point calibration depends on the ability to know a second temperature for the second point of correction. This may require an additional sensor, or may be made at room temperature. This room temperature point may be taken from a prior cooling or shut-down of the system. In diesel systems, heater inlet temperature is often available and may be used for the correction. The local maximum plus additional R-T point(s) could be used as a multi-point in situ calibration. Additional points could be R-T at room temperature or R at any other known temperature(s). FIG. 5 shows an example using data from FIG. 3. The resistance values at 200° C. and the local maximum were used to change the gain of the R-T characteristic and resulted in an effective calibration;

FIG. 6 shows three R-T curves for the same heater. Some shifting may have occurred, but the primary differences between the curves is due to calibration corrections within the measuring limits of the current transducer. When making a resistance measurement, both the cold portions of the circuit and the heated portions will contribute to the total resistance. The cold portions may include the lower resistance heater pins, portions of the power wiring and portions of the measuring circuit. Over time, resistances in these cold portions of the circuit may shift, for instance, a connection point could begin to oxidize and cause an increase in the resistance circuit. Since these errors would be the same for two or more measurements at different resistive heating element temperatures, the shift in the cold portions of the circuit could be negated.

Figure 7:
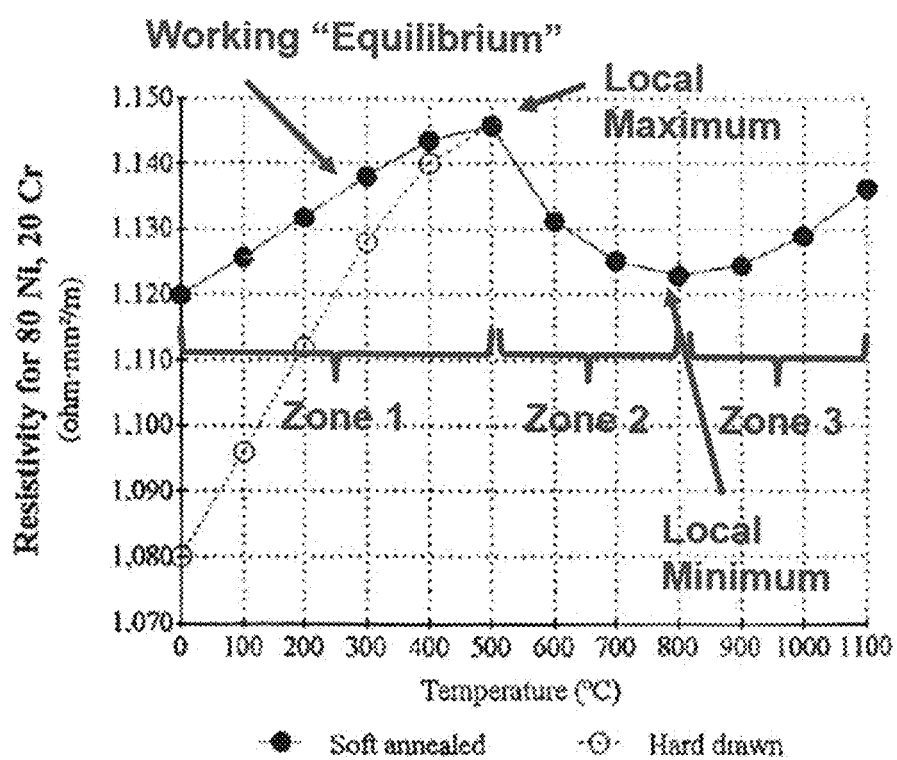
FIG. 7 is a graph illustrated the zones, including a negative dR/dT zone of a NiCr material used in accordance with the teachings of the present disclosure.

With regard to Nichrome, testing has been conducted on an 80/20 Nickel Chromium alloy, which exhibits a negative dR/dT over a temperature range within a "Zone 2" as shown in FIG. 7. It is within this zone, or temperature range, which, when overlapping with an operating temperature range of a specific heating application, where the NiCr material is being employed in a two-wire configuration such that both heating and temperature sensing are being provided by a single resistive heating element comprising a NiCr material.

Figure 8A:
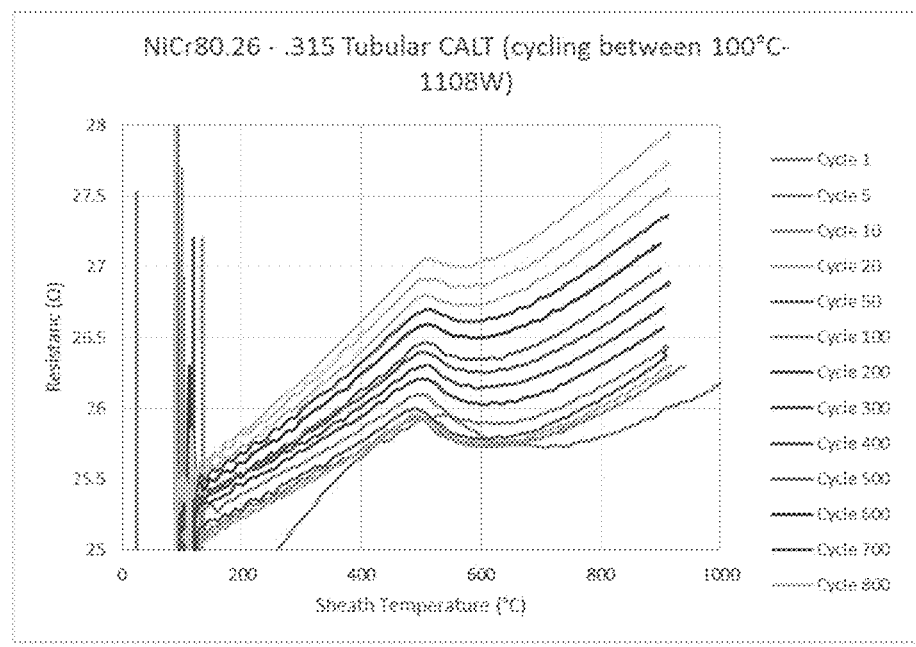
FIG. 8A is a graph illustrating the dR/dT characteristics of a NiCr material over multiple heating cycles according to testing conducted in accordance with the present disclosure.
Figure 8B:
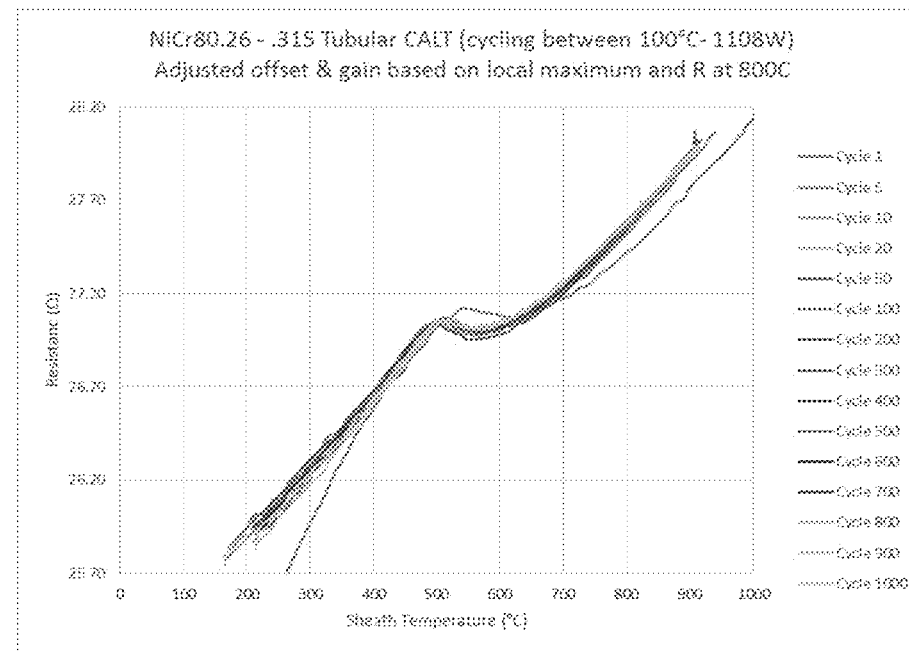
FIG. 8B is a graph illustrating adjustments made to correct for drift of a NiCr material over multiple heating cycles according to testing conducted in accordance with the present disclosure.

When temperatures reach into Zone 3, and depending on the rates of heating and cooling, irreversible changes in dR/dT may occur at a higher rate, including drift. In this instance, corrections can be made based on a local maximum and resistance at a local minimum, which are shown in FIG. 8A (illustrating the drift) and 8B (illustrating the corrections). As shown, permanent changes in resistance of the resistive heating element material do not significantly impact the reversibility shifts.

Generally, any material that undergoes a reversible physical change that results in a reduced electrical resistance over a known temperature range that at least overlaps, or is partially within, the operating temperature of a heater, or a heating portion of a circuit, and for which the change in resistance is at least about 2% (and in one exemplary form about 2.3%) between a local minimum and maximum (see, e.g., FIGS. 3 through 8B) can be employed while remaining within the scope of the present disclosure. Such a material should be understood to be a "limited negative dR/dT" material as used herein.

As used herein, the term "model" should be construed to mean an equation or set of equations, a tabulation of values representing the value of a parameter at various operating conditions, an algorithm, a computer program or a set of computer instructions, a signal conditioning device or any other device that modifies the controlled variable (e.g., power to the heater) based on predicted/projected/future conditions, wherein the prediction/projection is based on a combination of a priori and in-situ measurements.

Accordingly, a variety of different forms of heaters, sensors, control systems, and related devices and methods have been disclosed herein for use in fluid flow systems. Many of the different forms can be combined with each other and may also include additional features specific to the data, equations, and configurations as set forth herein. Such variations should be construed as falling within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating a heater system including a resistive heating element having a material with a non-monotonic resistivity vs. temperature profile, the method comprising:
    heating the resistive heating element to within a limited temperature range in which the resistive heating element exhibits a negative dR/dT characteristic;
    operating the resistive heating element within an operating temperature range that at least partially overlaps the limited temperature range; and
    determining a temperature of the resistive heating element by measuring a resistance of the resistive heating element, such that the resistive heating element functions as both a heater and a temperature sensor.

2. The method according to claim 1, further comprising the step of heating a fluid flow passing through the heating system.

3. The method according to claim 1, wherein the resistive heating element functions as a temperature sensor in a temperature range between 500° C. and 800° C.

4. The method according to claim 1, wherein the non-monotonic resistivity vs. temperature profile for the material of the resistive heating element has a local maximum and a local minimum.

5. The method according to claim 4 further comprising correcting for resistance drift in the material of the resistive heating element based on at least one of the local maximum and the local minimum of the non-monotonic resistivity vs. temperature profile.

6. The method according to claim 1, wherein the resistive heating element material comprises a composite ceramic and metal material having the negative dR/dT characteristic over the operating temperature range.

7. The method according to claim 1, wherein the resistive heating element material includes an instantaneous negative thermal coefficient of resistance greater than −175 ppm/° C. over the limited temperature range.

8. The method according to claim 1, wherein the resistive heating element functions as a temperature sensor at a temperature below 530° C.

9. The method according to claim 1, wherein the resistive heating element functions as a temperature sensor at a temperature above 850° C.

10. The method according to claim 1 further comprising applying the material having the negative dR/dT characteristic by a layering process selected from the group consisting of thick film, thin film, plasma spraying and solgel.

11. The method according to claim 1, wherein the resistive heating element is at least one resistive heating element arranged in a circuit.

12. The method according to claim 11, wherein the circuit defines an expected temperature profile across the circuit during operation and the method further comprises positioning at least one resistive heating element at a location in the circuit where a higher temperature is predicted compared to the expected temperature profile.

13. The method according to claim 11, wherein the circuit defines an expected temperature profile across the circuit during operation and the method further comprises positioning at least one resistive heating element at a location in the circuit where at least one of a higher temperature is predicted and a higher power density occurs compared to the expected temperature profile.

14. The method according to claim 11, wherein the circuit further comprises at least one second resistive heating element comprising a material having a positive dR/dT characteristic and the method further comprises positioning at least one second resistive heating element at a location in the circuit where at least one of a lower temperature and a lower power density occurs when compared to an average temperature profile.

15. The method according to claim 14, wherein the circuit includes a plurality of resistive heating elements comprising a material having a negative dR/dT characteristic and a plurality of resistive heating elements comprising a material having a positive dR/dT characteristic and the method further comprises arranging the plurality of resistive heating elements comprising the material having the negative dR/dT characteristic and the plurality of resistive heating elements comprising the material having the positive dR/dT characteristic in the circuit according to predetermined positions corresponding to at least one of higher power density locations, lower power density locations, higher temperature locations, and lower temperature locations, respectively.

16. The method according to claim 15, further comprising positioning the plurality of resistive heating elements comprising the material having the negative dR/dT characteristic and the plurality of resistive heating elements comprising the material having the positive dR/dT characteristic in multiple layers relative to each other.

17. The method according to claim 1, wherein the heater system further comprises a two-wire configuration for the resistive heating element and the method operates the resistive heating element as both a heater and a temperature sensor within the operating temperature range and operates the resistive heating element as a heater outside the operating temperature range.

18. A method of operating a heater system comprising:
    operating a resistive heating element within a predetermined operating temperature range that at least partially overlaps a predefined limited temperature range, wherein a material of the resistive heating element has a non-monotonic resistivity vs. temperature profile and exhibits a negative dR/dT characteristic within the limited temperature range; and
    determining a temperature of the resistive heating element by measuring a resistance of the resistive heating element, such that the resistive heating element functions as both a heater and a temperature sensor.

19. The method according to claim 18, wherein the resistive heating element functions as a temperature sensor in a temperature range between 500° C. and 800° C.

20. The method according to claim 18, wherein the non-monotonic resistivity vs. temperature profile for the material of the resistive heating element has a local maximum and a local minimum.

21. The method according to claim 20 further comprising correcting for resistance drift in the material of the resistive heating element based on at least one of the local maximum and the local minimum of the non-monotonic resistivity vs. temperature profile.

* * * * *